United States Patent
Wong et al.

(10) Patent No.: US 6,754,800 B2
(45) Date of Patent: Jun. 22, 2004

(54) METHODS AND APPARATUS FOR IMPLEMENTING HOST-BASED OBJECT STORAGE SCHEMES

(75) Inventors: Thomas K. Wong, Pleasanton, CA (US); Panagiotis Tsirigotis, Mountain View, CA (US); Sanjay R. Radia, Fremont, CA (US); Rajeev Chawla, Union City, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/987,249

(22) Filed: Nov. 14, 2001

(65) Prior Publication Data

US 2003/0093645 A1 May 15, 2003

(51) Int. Cl.[7] .............................................. G06E 12/00
(52) U.S. Cl. ........................ 711/216; 711/118; 707/100
(58) Field of Search .................................. 711/216, 118, 711/119; 709/203; 707/100

(56) References Cited

U.S. PATENT DOCUMENTS 6,453,319 B1 * 9/2002 Mattis et al. ............... 707/100

* cited by examiner

Primary Examiner—Kimberly McLean-Mayo
(74) Attorney, Agent, or Firm—Finnegan, Henderson, Farabow, Garrett & Dunner L.L.P.

(57) ABSTRACT

Systems and methods are disclosed in which a computer system having main memory and persistent memory is caused to perform a method for caching related objects. The computer system receives a plurality of objects from an origin server and computes a hash value based on source information about an object. Then the computer system stores the object based on the hash value with other related objects. Additionally, a computer system consistent with the present invention may retrieve related objects from the cache by performing a batch read of related objects.

26 Claims, 7 Drawing Sheets

HASH ENTRY

| WEB OBJECT URL | SIZE | DISK ID | DISK LOC | (MEM ADDR) |
|---|---|---|---|---|
| 600 | 610 | 620 | 630 | 640 |

METHODS AND APPARATUS FOR IMPLEMENTING HOST-BASED OBJECT STORAGE SCHEMES

DESCRIPTION OF THE INVENTION

1. Field of the Invention

The present invention relates generally to caching objects and in particular to caching objects that are related to a common host computer system.

2. Background of the Invention

The Internet is a world-wide collection of interconnected networks that is widely used to access information. A web server is an Internet-connected computer system that can provide information to Internet-connected client computers. Client computers use a computer program called a web browser to connect to and access information on web servers. Using a web browser, a user of an Internet-connected computer can access a huge number of different web servers. The vast collection of web servers available on the Internet is frequently referred to as the World Wide Web.

A web browser displays information received from a web server in units that have the appearance of pages, and because of their appearance, the pages downloaded from web servers and displayed by web browsers are frequently referred to as web pages. Web pages may contain references to elements including formatted text, images, and program code. The web pages and the referenced elements, such as image files and HTML documents, are sometimes called web objects. For example, when a web page contains a reference to a graphical image that should be displayed with the web page, the web page contains a reference to a graphic file. The graphic file and the file containing the information about the web page are called web objects. A general term for an information entity is "object."

As Internet access becomes more popular, less expensive and faster, and as the number of web clients increases, so does the number of connections made to particular origin servers. This increased number of connections can increase both network load and server load, sometimes causing parts of the Internet and particular origin servers to become so overloaded that they become inaccessible. Caching can be used to improve this situation.

A caching server may be used as an intermediary between a client and an origin server. Instead of a service request message being sent to an origin server, the message is routed to a proxy server. The proxy server handles the request by forwarding it to the origin server, receiving the requested information from the origin server, and transmitting the requested information to the client.

To expedite retrieval of requested information, a conventional proxy server often stores retrieved information in a local cache in the proxy server. When the proxy server receives a service request message from a client, it first determines whether the information requested by the service request message is already stored locally in the proxy server cache. If the requested information is stored in the proxy server cache, it is retrieved from the cache and returned to the client. If the information is not stored in the proxy server cache, the proxy server requests the information from the origin server. When the proxy server receives the requested information from the origin server, it sends the information to the client and also caches the information in the local proxy server cache. Caching can alternatively or additionally be done at other locations in a network. For example, a web browser can cache information locally at the client.

Various mechanisms for caching data are used in computer systems to reduce system loads by storing copies of frequently accessed information in places closer to where the information is likely to be needed. In response to a request from an information requester, a cache system determines whether the information is cached. If not, it is called a cache miss, and the cache system requests the information from the appropriate information provider, also saving a copy of the information in its local cache. If the information is already in the cache, it is called a cache hit. In either case, the information is then forwarded to the requester. By thus reducing loads and locating data closer to where it is needed, caching systems make data access more efficient.

Cache systems can improve the speed of information transfer between an information requester and an information provider. Cache systems generally include a high speed memory, such as, for example RAM, that stores information that was most recently requested from an information provider. A cache is often used in networks to expedite transferring information between a client and an origin server.

A protocol defines how the client and origin server communicate. The Internet, for example, uses protocols such as the Hypertext Transfer Protocol ("HTTP") to transfer web objects. In HTTP, a client sends a service request message to an origin server. For example, a service request message may include a request method to be performed on an object in the origin server. The object may be identified in the service request message by a name or an identifier of the object. In one embodiment, an object is represented as a web page and the identifier is a uniform resource locator ("URL"), which is a path to the object. The origin server responds to the service request message by performing the method in the request method. The request method may be a retrieve operation, which causes the origin server to retrieve the object identified by the URL, and transmit it to the requesting client.

Since the number of available documents in the web is huge, it is advantageous for a web caching system to use a large cache to increase the likelihood of a web hit. However, filling up a large cache with web objects may take a long time, potentially longer than acceptable, and it is therefore important to preserve the contents of a large cache during and after a system shutdown. Therefore, most web caching systems store cached web objects in a large but slow persistent storage, such as disk drives. Unfortunately, reading data from or writing data to a disk is slow, much slower than access to fast main memory. To reduce the delays associated with requests for web objects cached on disk drives, known caching systems use a fast-main-memory cache that is generally smaller than the persistent cache to store copies of web objects that are deemed most likely to be requested in the immediate future.

Typically, a web client accesses many pages from an origin server, one page at a time. Each page may refer to many other web objects including images and text. Typical web objects may be as small as 10 K bytes, or even smaller. To access a complete page that has not been previously cached by a web caching system, i.e. a cache miss, many separate requests must be made by a web browser. In the HTTP protocol, for example, this results in a separate request for each web object that is associated with a web page. Thus a cache miss for a web page usually results in one or more writes to disk for storing the retrieved objects referenced in the page. Similarly a cache hit for a page that is not in the fast main memory cache may result in one or more reads to the disk to retrieve each web object referenced in the page. Thus, requesting a web object that is not in the fast main memory cache always results in at least one disk input or output ("I/O") operation, a minimum of one disk write for a cache miss and a minimum of one disk read for a cache hit. Since there are typically multiple web objects associated with a particular web page, this means that there will typically be multiple disk I/O operations associated with the caching or serving of a web page.

Disk access is significantly slower than fast main memory access. Typically, a disk can handle a small number of I/O operations per second. Since a cache hit or a cache miss for a web object usually results in at least one disk I/O, the cache throughput (number of web client requests that can be handled per second) of a web caching system is limited by the total number of I/O operations that can be supported by the disks used in the caching system. Thus, in some caching systems, disk access is the biggest bottleneck in maximizing cache throughput.

Strategically adding hardware to a caching system can increase the cache throughput. For example, if a larger fast-main-memory cache is used, more web objects may be stored in fast main memory, thereby reducing a probability of having to access a disk to retrieve a stored web object. Similarly, web objects may be distributed over multiple disks, thereby allowing multiple concurrent disk accesses and increasing the number of client requests that can be processed per second. While persistent storage devices are each relatively slow, they can operate in parallel, thereby increasing the total number of I/O operations per second.

Unfortunately, adding hardware to a caching system also increases the cost of the system. It is therefore advantageous to employ a design that improves caching throughput without depending on additional hardware. It is also desirable for such a design to scale-up in caching throughput with the use of additional hardware.

SUMMARY OF THE INVENTION

Consistent with the present invention, systems, methods, and computer-readable media are involved in caching of related objects. A plurality of objects is received from at least one origin server. A hash value is computed corresponding to source identifying information for at least one object in the plurality of objects. In at least one data structure of a plurality of data structures, the object is stored based on the computed hash value, the object being stored with related objects having related hash values.

Additional benefits of the invention will be set forth in part in the description which follows, and in part will be obvious from the description, or may be learned by practice of the invention. The benefits of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the invention and together with the description, serve to explain the principles of the invention. In the drawings.

DETAILED DESCRIPTION OF THE EMBODIMENTS

Figure 1:
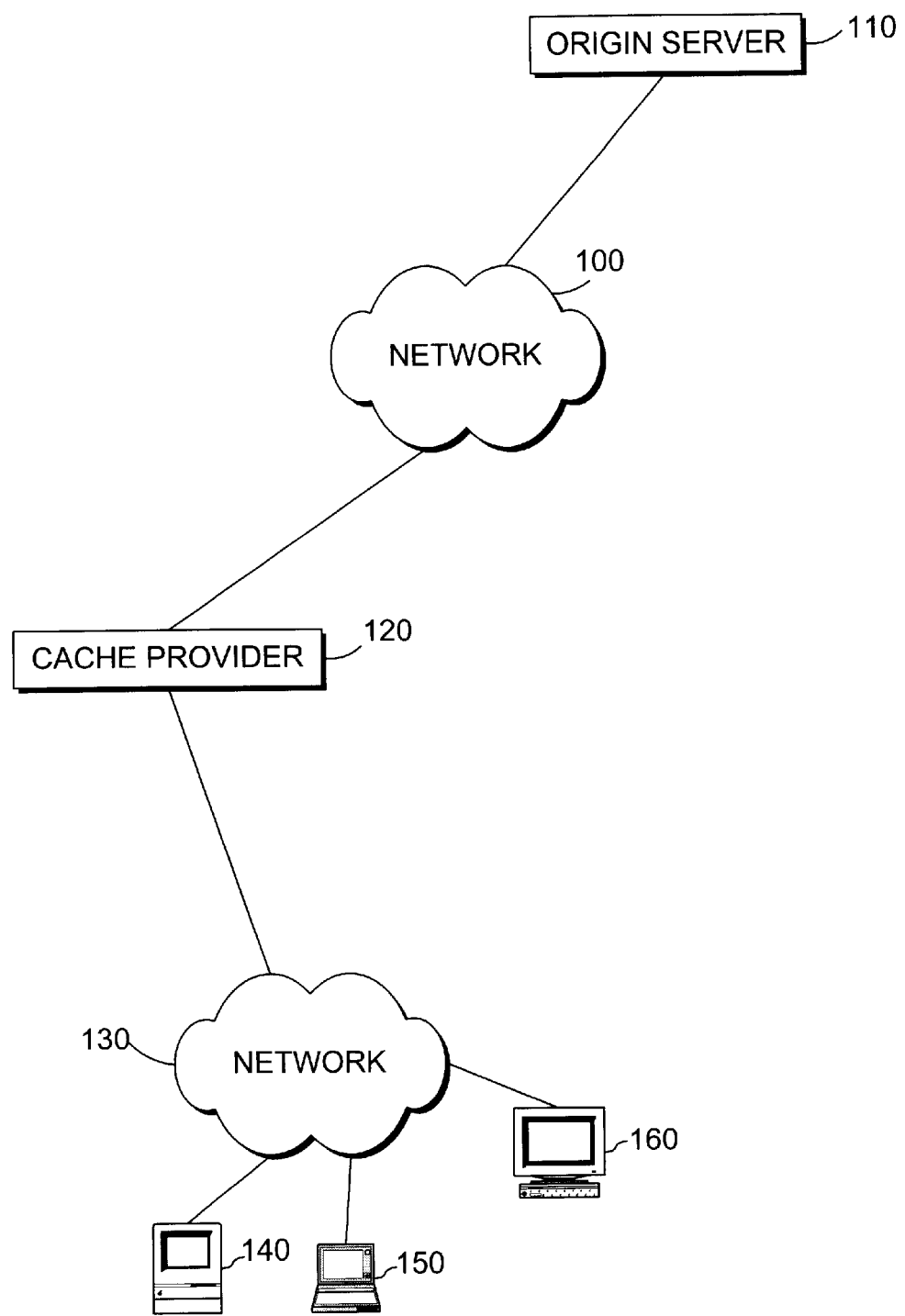
FIG. 1 is a block diagram of a system in which the present invention may be practiced.

Reference will now be made in detail to the present exemplary embodiments of the invention, examples of which are illustrated in the accompanying drawings. Wherever possible, the same reference numbers will be used throughout the drawings to refer to the same or like parts.

A hash table is a data structure that utilizes a hash function to quickly locate an entry or a group of entries within a table of entries. Each entry or group of entries is identified by a hash value. A hash value is computed by applying a hash function to at least part of the information contained in a table entry. The entry or group of entries corresponding to a particular hash value is sometimes called a hash bucket. To add a new entry to a hash table, a hash function is applied to information within the new entry. If there is already an entry associated with the computed hash value corresponding to the new entry, an event called a hash collision occurs. There are several approaches that may be used in response to a hash collision. The choice of hash functions and schemes for handling hash collisions generally involves trade-offs between efficiencies of computation time versus an amount of storage space. It will be apparent to one of ordinary skill to choose a hash function and collision scheme that will work with the invention based on the anticipated size of the cache for a particular caching system.

Since objects that are referenced in a single page must be accessed at about the same time, it is desirable to store the related objects together, so that reading and writing of a batch of related objects may be done with a single read or write operation. The use of batch read and write operations increases cache throughput by reducing the number of relatively slow disk accesses per web page.

In one embodiment a file or a storage system is provided that caches web objects using identifiers called URLs, which may be represented as variable length character strings. For convenience, this embodiment may be referred to as the "urlfs," however, the invention applies to caching and storage of other kinds of objects, which may have different names or identifiers other than URLs. The urlfs consists of two caches, a fast main memory cache and a persistent cache that may consist of one or more disks. Web objects cached by urlfs may be stored in memory and in a disk or in a disk only. The fast main memory cache consists of a hash table, a set of write buffers and index buffers and an object cache that contains the newly retrieved or most likely referenced web objects.

The memory cache maintains a set of write buffers for web objects waiting to be written to a disk. When a new web object is received from the origin server, the web object is first placed into the object cache. The URL-hash and host-hash for the new web object are computed and the host-hash is then used to select one of the write buffers to store the web object. A hash table entry for the web object is then created and the write buffer and the location within the write buffer where the web object is stored is entered into the hash table entry. The hash value of the URL of the web object is then used to locate a bucket in the hash table where the hash table entry should be stored.

In a urlfs embodiment, each web object is stored in a variable size container called a cell, and each web object is contained entirely within a single cell. In this scheme, the size of a cell may be an integer multiple of the size of a persistent-storage data block, which may be, for example, the minimum storage allocation unit of a disk. Disks in the urlfs have the same data block size. The attributes of a cell include the cell number, the size in number of data blocks, the URL-hash and the host-hash of the web object contained in the cell.

In the urlfs, a web object is identified by a "URL." The URL of a web object also contains a variable size host identification that identifies the origin server of the web object. The URLs of web objects referenced in a page frequently contain the same host identification, but not always. For instance web objects may be duplicated on multiple servers, and a particular server may be referred to by multiple host names. Additionally, in many cases a web page may contain references to web objects that are stored on other origin servers.

Even though URLs and host identifiers are of variable size, a hash function can be used to generate fixed size hash values that are much smaller and that can facilitate efficient indexing of information within a hash table. One embodiment employs hash values from the URL of a web object and from the host identification of the web object to facilitate batch reading and writing of web objects referenced in the same page. The hash value of the URL of a web object is referred to as the URL-hash and the hash value of the host identifier of a web object is referred to as the host-hash.

Systems and methods consistent with the present invention may utilize cyclic buffers that use an index to map consecutively numbered logical blocks to physical buffer blocks of the cyclic buffer. The index to the cyclic buffer is implemented using the logical block numbers. When new information is added to the cyclic buffer, the next logical block number is assigned to the information. The new logical block number corresponds to a physical cyclic buffer block. The new logical block number and key associated with the information are then added to the index. The mapping of logical block numbers to physical block numbers may simply be a mathematical formula that defines the relationship between the logical block numbers and physical block numbers.

To retrieve information from the cyclic buffer, the index is first scanned to determine whether an index entry exists that has a key associated with the information. If such a key is present, the entry is accessed to determine the logical block number associated with the key. The logical block number may then be mapped to a physical block number, and the physical block number used to access data associated with a cyclic buffer. A physical block number corresponds to the actual hardware block to be read from a persistent storage device, whereas a logical block number corresponds to a software abstraction, which may be used to order physical blocks in various ways. For example, some disk drives provide access to information in 512 byte blocks. A physical block number may correspond to a sequential ordering of these blocks, such that physical block one corresponds to the first block accessible by the hardware as designed and block two corresponds to the second block accessible by the hardware.

It may be convenient to use a block numbering system having logical block numbers that are different from the physical block numbers as implemented in the hardware of a persistent storage device. For example, it may be convenient to use a logical numbering system corresponding to a circular buffer, in which a particular logical block may not correspond to a physical block having the same number.

FIG. 1 is a block diagram of a system in which the present invention may be practiced. Clients 140, 150, and 160 are connected to network 130. Cache provider 120, connected between network 130 and network 100, handles service requests from clients 140, 150, and 160. In one embodiment, cache provider 120 may be a caching proxy web server. In another embodiment cache provider 120 may be a caching file server. In yet another embodiment, cache provider 120 may be a caching system that is implemented on a computer having client software, such as for example, in the case of a client side caching application. In response to a service request for information from a client, such as client 140, cache provider 120 either returns information from its local cache, or retrieves information from origin server 110, forwarding the information to client 140. If the information is not already in the local cache, the information is retrieved from origin server 1 10 and cache provider 120 then caches the information locally for later use. This is called a cache miss. Caching the information allows cache provider 120 to quickly provide the information to a client at a later time if the same information is requested again. When the information is found in the local cache and directly provided to the requesting client, it is called a cache hit.

Figure 2:
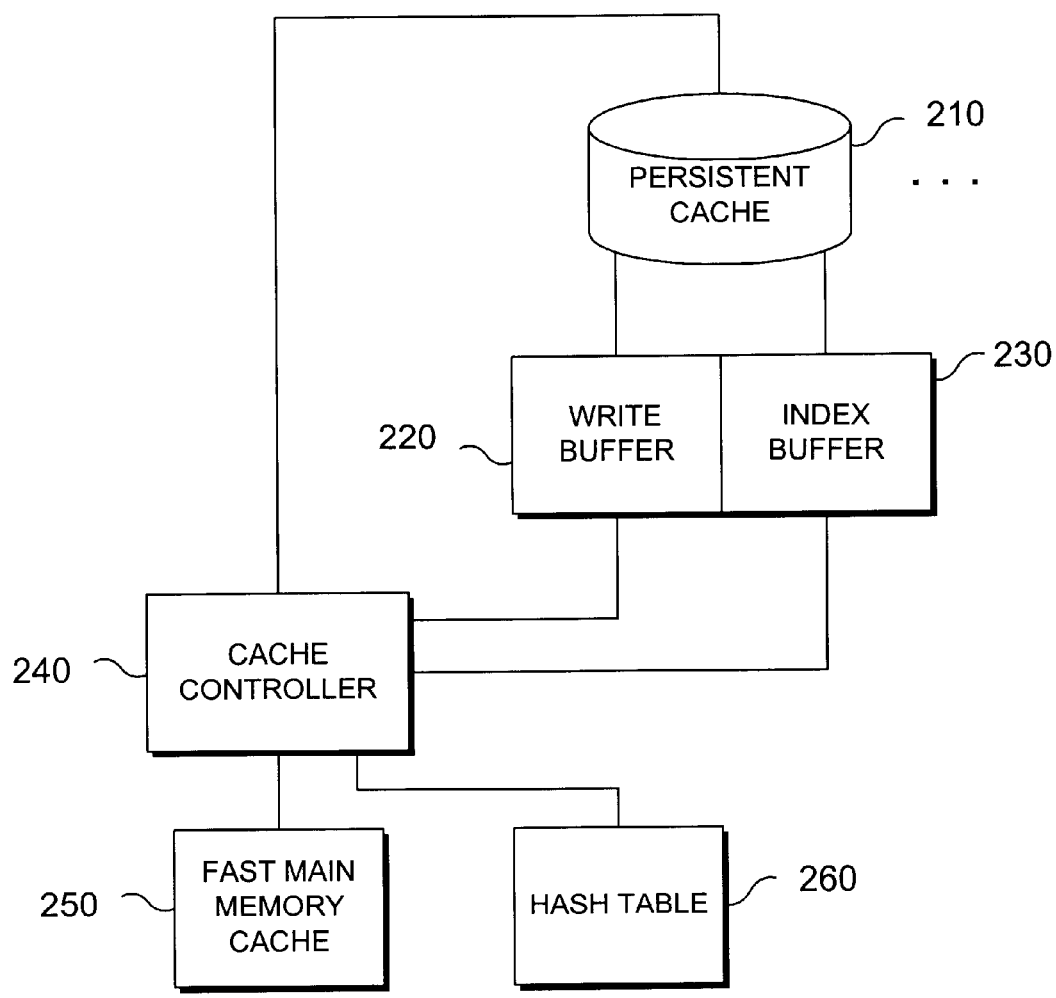
FIG. 2 is a block diagram of a cache system consistent with the present invention.

FIG. 2 is a block diagram of a cache system consistent with the present invention. Cache provider 120 has a cache controller 240. Cache controller 240 is logically connected to fast main memory cache 250. Cache controller 240 is also logically connected to a hash table 260. In one embodiment, both fast main memory cache 250 and hash table 260 reside in fast main memory. Hash table 260 contains hash entries as further described in connection with FIG. 6. Cache controller 240 determines whether a web object is stored in persistent cache 210 or in fast main memory cache 250 by referring to hash table 260. For example, in response to a request for a particular web object, cache controller 240 looks up the web object in hash table 260. This process is further described in connection with FIG. 8. Cache controller 240 is also logically connected to write buffer 220 and index buffer 230.

Persistent cache 210 is cache memory, the contents of which remain valid even in situations where normal main memory would not retain its memory contents, such as when power is disconnected from the memory. Persistent cache 210 could be implemented, for example, using disk drives or other non-volatile memory devices. In one embodiment, persistent cache 210 comprises a plurality of disks that may be of different sizes. In the embodiment, each web object stored in persistent cache 210 has an index corresponding to each stored web object.

The persistent cache may include metadata. Metadata is data about data, and, in the urlfs, it contains information about how data is stored and formatted within the persistent storage. The metadata may be stored at the same location on each disk, and it stores information for accessing indexes corresponding to buffers within the persistent storage. In one embodiment, the metadata includes a timestamp, a start of index pointer, an index area size indicator, an index pointer, a start of data pointer, a data area size indicator and a data pointer.

To facilitate the storing of web objects in persistent cache 210, write buffer 220 is used to accumulate a group of web objects before they are written to persistent cache 210. This is because, in some types of persistent memory devices, such as disk drives, there is a fixed delay associated with writing to the device, regardless of the number of bytes being written. Therefore, efficiency is achieved by accumulating information in fast main memory before incurring the delay associated with writing to a relatively slow device. Index buffer 230 is used to locate a desired area within persistent cache 210 by associating an index value with a location in persistent cache 210 as further described in connection with FIG. 8.

Figure 3:
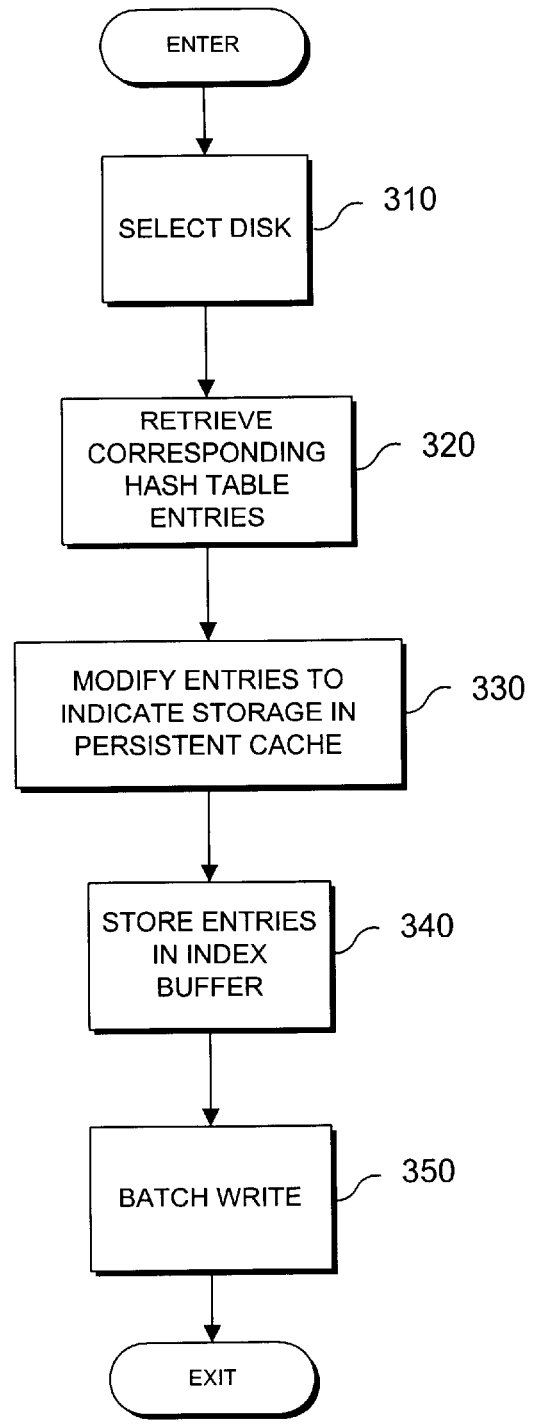
FIG. 3 is a flow diagram illustrating a method of batch writing objects consistent with the present invention.

FIG. 3 is a flow diagram illustrating a method of batch writing objects consistent with the present invention. When write buffer 210 becomes full or at other predetermined times, a disk is selected to store the contents of write buffer 210. First, the system determines which disk to use (box 310). There are several possible choices when selecting a disk within persistent cache 210 for storing contents of write buffer 220. For example, an idle disk or a least busy disk may be selected. One embodiment uses the host-hash to select a disk that has a disk number equal to the remainder of the host-hash divided by the number of disks in the storage system. Next, the system accesses hash table entries corresponding to the web objects contained in write buffer 220 (box 320). This is done by computing the URL-hash value corresponding to the web objects. Within the hash entry, the information about the web object is then modified to indicate the web object as being stored in persistent cache (box 330). One embodiment also records a disk identifier associated with the selected disk and updates the new cell number within the data buffer.

An index entry for a web object is then created using the contents from the hash table entry. The new index entry is written to the index buffer associated with the write buffer (box 340). In preparation to batch write out the web objects, the cell number of each cell corresponding to web objects is recomputed by adding the value of the next available cell number within the data buffer in persistent cache 210. In one embodiment, after the cell numbers are recomputed, the next available cell number of the disk is then incremented by the number of data blocks occupied by all of the cells in the write buffer. Finally, the write buffer may then be written to the disk in one batch write (box 350). Because of batch writes, objects in a write buffer that are waiting to be written to a disk may be lost in a system crash. This is acceptable because a lost cache object will merely result in a cache miss the next time the web object is requested. In response to the subsequent cache miss, the object will be cached again.

Figure 4:
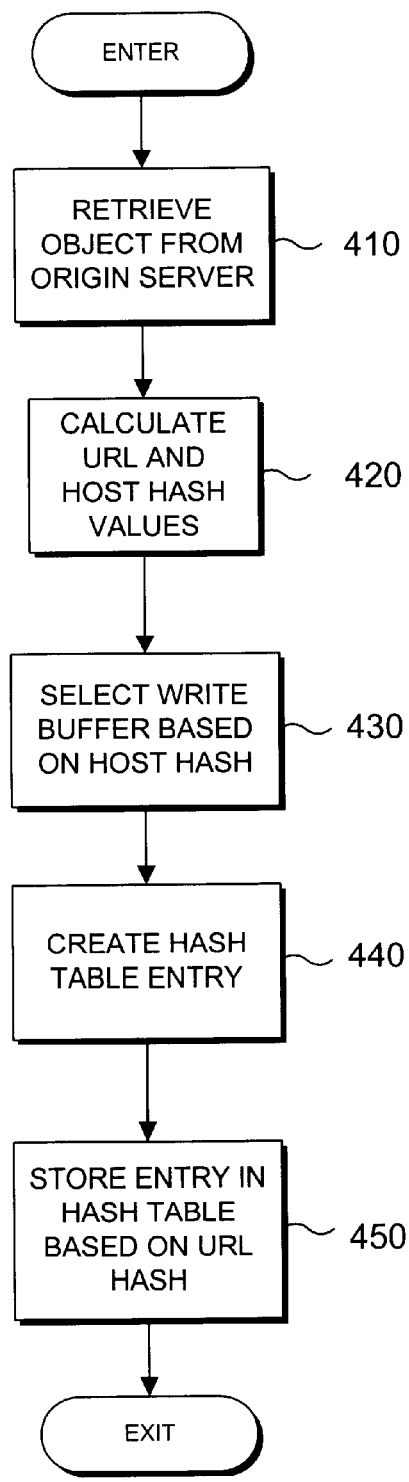
FIG. 4 is a flow diagram illustrating a method, consistent with the present invention, of storing retrieved objects in a hash table.

FIG. 4 is a flow diagram illustrating a method, consistent with the present invention, of storing retrieved web objects in a hash table. To begin the process, an object is retrieved from an origin server (box 410). Next, corresponding URL-hash and host-hash values are calculated (box 420). Next, a write buffer is selected based on the host-hash value (box 430). Next, a new hash table entry is created (box 440). Next, the new hash table entry is stored in the hash table based on the URL-hash (box 450).

Figures 5, 6:
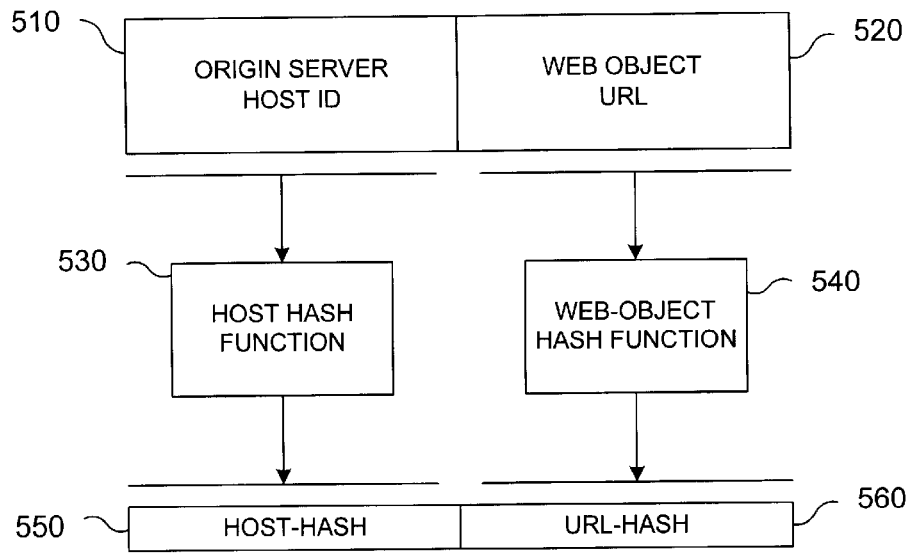
FIG. 5 is a block diagram of a system, consistent with the present invention, for computing hash values.
FIG. 6 is a block diagram of a hash table consistent with the present invention.

FIG. 5 is a block diagram of a system, consistent with the present invention, for computing hash values. In one embodiment consistent with the present invention, origin server host identifier 510 is the source of information for computing host-hash 550. In one embodiment, host identifiers may be domain name system ("DNS") host names as conventionally used in the Internet. Host identifier 510 may be, for example, www.sun.com. In order to calculate host-hash 550, host-hash function 530 is applied to host identifier 510. Similarly, in one embodiment, web object URL 520 is used to calculate URL-hash 560. This calculation is performed by applying web-object hash function 540 to URL 520.

FIG. 6 is a block diagram of a hash table consistent with the present invention. In one embodiment, a hash table entry comprises a URL 600 corresponding to a web object, a size 610 of the web object, disk ID 620, and disk location 630, indicating where the web object is stored. If the web object is also stored in memory, the cache entry will also contain memory address 640 corresponding to the address of the web object in the fast main memory cache.

Figure 7:
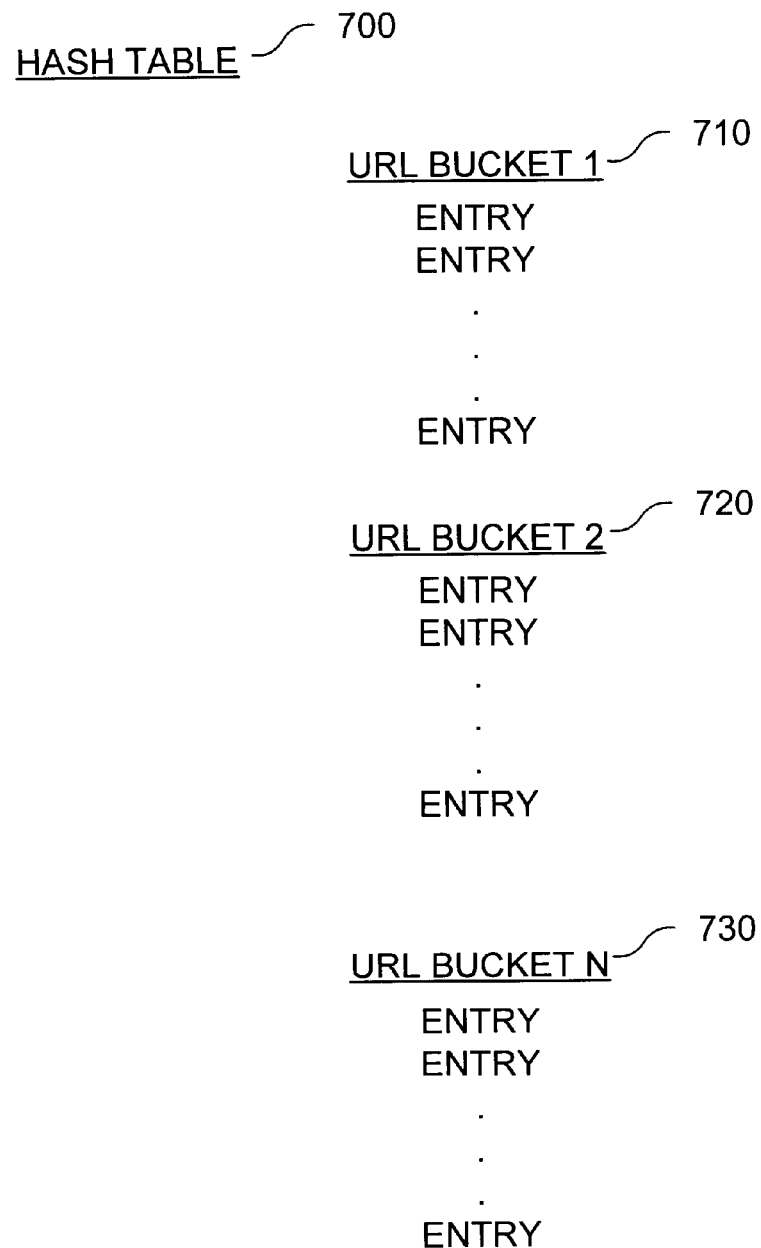
FIG. 7 is a block diagram of a hash table, consistent with the present invention, with URL buckets.

FIG. 7 is a block diagram of a hash table, consistent with the present invention, with URL buckets. In one embodiment, hash table 700 is comprised of multiple buckets such as, for example, URL buckets 710, 720 and 730. Each URL bucket contains entries as described in connection with FIG. 6.

Figure 8:
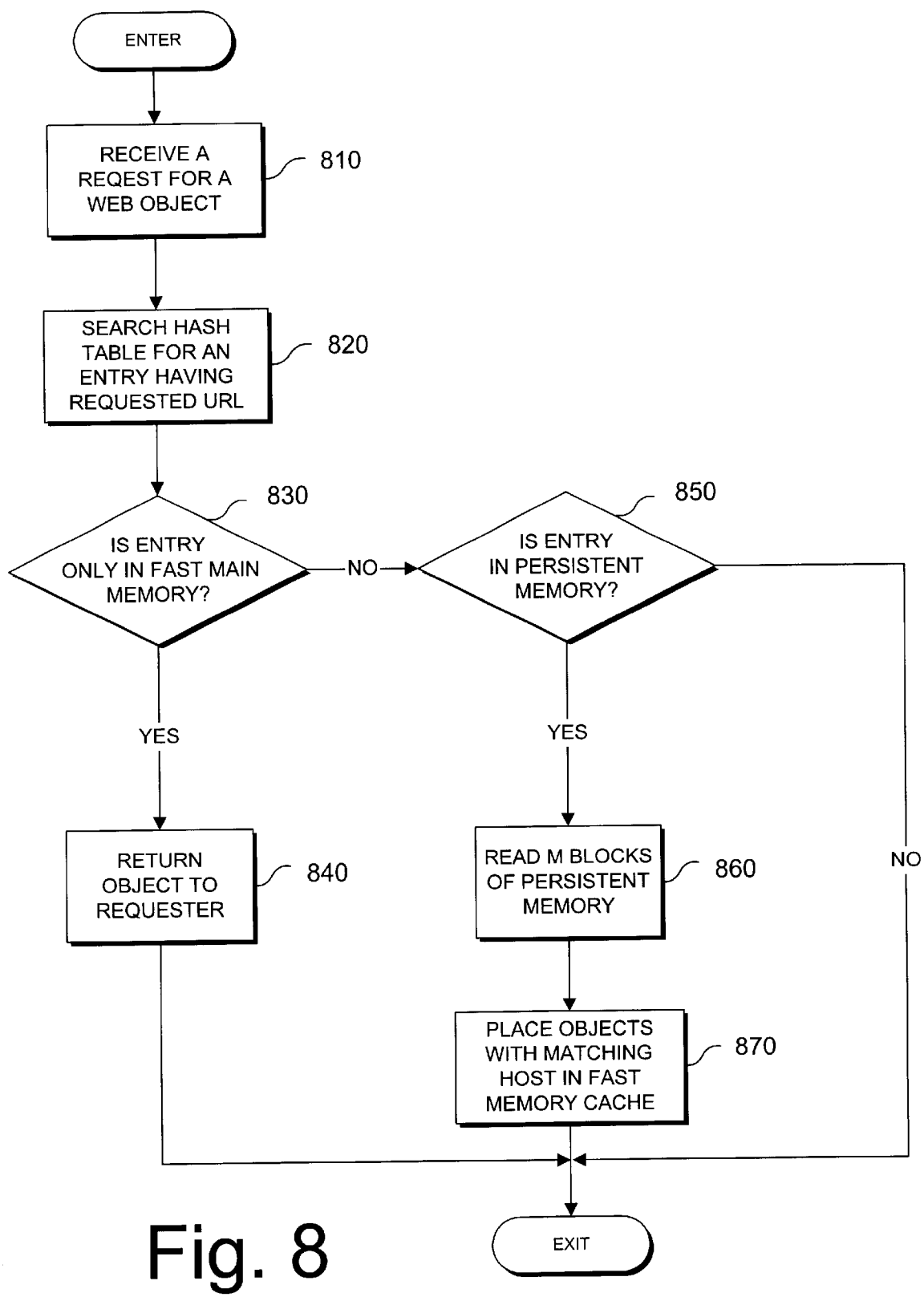
FIG. 8 is a flow diagram of a method, consistent with the present invention, for responding to a request from a requester.

FIG. 8 is a flow diagram of a method, consistent with the present invention, for responding to a request from a web client. First, the method comprises receiving a request for a web object (box 810). The hash table is then searched to locate a hash table entry that has the same URL bucket (box 820). If the hash table entry indicates that the web object is in the memory cache (box 830), the object is returned to the requester (box 840) and the process is complete. Otherwise, it is determined whether the object is stored in persistent memory (box 850). Since many disks can retrieve additional blocks with little additional overhead, an integer number M additional data blocks may be read after the first cell read at the identified disk location (box 860). In one embodiment, not all web objects contained in the extra blocks are placed in the object cache. In this embodiment, only web objects with host identifiers that are the same as the requested web object are placed into the object cache. Web objects that do not have matching identification are ignored for lack of relevance. The hash table entry of each web object that is retrieved from persistent cache in a batch read may then be updated to indicate that the object is now in the fast-main-memory object cache. This may be accomplished by using the URL-hash to select the bucket with the corresponding hash table entry.

The foregoing description of embodiments of the invention has been presented for purposes of illustration and description. It is not exhaustive and does not limit the invention to the precise form disclosed. Modifications and variations are possible in light of the above teachings or may be learned from practicing the invention. For example, the described implementation includes software, but the present invention may be implemented as a combination of hardware and software or in hardware alone, The scope of the invention is defined by the claims and their equivalents.

We claim:

1. In a system having main memory and persistent memory, the main memory containing at least one data buffer, a method for caching related objects, the method comprising:

receiving a plurality of objects from at least one origin server;

computing a hash value corresponding to source identifying information for at least one object in the plurality of objects, wherein computing comprises:
  computing a first hash value based on an object identifier associated with the object server; and
  computing a second hash value based on a host identifier associated with the origin server; and
storing, in at least one data structure of a plurality of data structures, the object based on the computed hash value, wherein the object is stored with related objects having related hash values.

2. A method according to claim 1, wherein the plurality of data structures further comprises:
  an index buffer capable of storing index entries;
  an object buffer capable of storing and retrieving objects by logical block number; and
  a metadata buffer capable of storing information about the index buffer and the object buffer.

3. A method according to claim 2, wherein the index buffer is a cyclic index buffer.

4. A method according to claim 1, wherein the object identifier is a uniform resource locator.

5. A method according to claim 4, wherein the host identifier is a domain-name-service host name associated with the origin server.

6. A method according to claim 1, wherein storing the object using a plurality of data structures further comprises:
  selecting a write buffer based on the second hash value, the write buffer selected from a plurality of write buffers; and
  storing information about the object in a hash table using the first hash value.

7. A method according to claim 6, wherein the write buffer is contained in fast main memory.

8. A method according to claim 6, wherein the persistent memory comprises a disk storage device.

9. A method according to claim 5, wherein storing the object further comprises:
  selecting a write buffer based on the second hash value, the write buffer selected from a plurality of write buffers; and
  storing information about the object in a hash table using the first hash value.

10. A method according to claim 6, further comprising:
  selecting a persistent storage device on which to write objects to be written that are stored in fast main memory;
  retrieving hash table entries corresponding to the objects to be written; and
  modifying the hash table entries to indicate that the objects to be written are stored in persistent storage.

11. A method according to claim 10, wherein the persistent storage device is a disk storage device.

12. A method according to claim further comprising:
  selecting a persistent storage device on which to write objects to be written that are stored in fast main memory;
  retrieving hash table entries corresponding to the objects to be written; and
  modifying the hash table entries to indicate that the objects to be written are stored in persistent storage.

13. A method according to claim 12, wherein the persistent storage device is a non-volatile memory storage device.

14. A method according to claim 10, further comprising:
  storing information about the objects to be written in the index buffer; and batch writing the objects to be written to persistent storage.

15. In a system having main memory and persistent memory, the main memory containing at least one data buffer, a method for retrieving cached related objects comprising:
  receiving a request for an object, the request comprising an object identifier;
  looking up the requested object in a hash table using the object identifier;
  determining whether the object is stored in persistent memory;
  retrieving a group of related objects from an object buffer capable of storing and retrieving objects by logical block number, when it is determined that the object is stored in persistent memory; and
  discarding those retrieved objects that do not have an origin server host identifier in common with the requested object.

16. A method according to claim 15, wherein receiving a request for an object further comprises receiving a request from a web client for a web object.

17. A method according to claim 15, wherein the object identifier is a uniform resource locator.

18. A method according to claim 15, wherein retrieving a group of related objects from an object buffer further comprises:
  reading an integer number of logical blocks in a single read operation.

19. A computer system having main memory and persistent memory, the main memory containing at least one data buffer, and an execution unit capable of executing program code, the computer system comprising:
  a network interface capable of receiving information comprising a plurality of objects from at least one host computer;
  a controller configured to calculate a hash value corresponding to source identifying information for at least one object in the plurality of objects by at least computing a first hash value based on an object identifier associated with the object, and computing a second hash value based on a host identifier associated with the origin server; and
  a memory used to store, in at least one data structure of a plurality of data structures, the object based on the hash value, wherein the object is stored with related objects having related hash values.

20. A computer system comprising:
  means for receiving data comprising a plurality of objects from at least one origin server;
  means for computing a hash value corresponding to source identifying information for at least one object in a plurality of objects, wherein computing comprises:
    computing a first hash value based on an object identifier associated with the object, and
    computing a second hash value based on a host identifier associated with the origin server; and
  storing, in at least one data structure of a plurality of data structures, the object based on the computed hash value, wherein the object is stored with related objects having corresponding hash values.

21. A computer-readable medium containing program code capable of causing a computer system to execute a method for caching related objects, the computer-readable medium comprising:
  program code operative to receive a plurality of objects from at least one origin server;

program code operative to compute a hash value corresponding to source identifying information for at least one object in the plurality of objects by at least computing a first hash value based on an object identifier associated with the object, and computing a second hash value based on a host identifier associated with the origin server; and program code operative to store, in at least one data structure of a plurality of data structures, the object based on the computed hash value, wherein the object is stored with related objects having corresponding hash values on a disk storage device.

22. A computer-readable medium according to claim 21, wherein the program code operative to store the object further comprises:

program code operative to select a memory region based on the second hash value, the memory region selected from a plurality of memory regions; and program code operative to store information about the object in a hash table using the first hash value.

23. A computer-readable medium according to claim 22, further comprising:

program code operative to select a disk on which to write information comprising a plurality of objects from fast main memory;

program code operative to retrieve hash table entries corresponding to the objects to be written; and program code operative to modify the hash table entries to indicate that the objects to be written are stored on disk.

24. A computer-readable medium according to claim 23, further comprising:

program code operative to store an identification of the objects to be written in an index buffer; and program code operative to cause the objects to be written to disk in at least one batch write operation.

25. A computer-readable medium having main memory and persistent memory, the main memory containing at least one data buffer, and an execution unit capable of executing program code to perform a method for retrieving cached related objects, the computer-readable medium comprising:

program code operative to receive a request for an object, the request comprising an object descriptor;

program code operative to identify the requested object based on the object descriptor, using a hash table;

program code operative to determine whether the object is stored on disk;

program code operative to accept a group of related objects from an object buffer, when it is determined that the object is stored on disk; and program code operative to discard those objects that do not have an origin server host identifier in common with the requested object.

26. A computer-readable medium according to claim 25, wherein the program code operative to accept a group of related objects from an object buffer further comprises:

program code operative to batch read information from disk.

* * * * *

UNITED STATES PATENT AND TRADEMARK OFFICE
CERTIFICATE OF CORRECTION

PATENT NO. : 6,754,800 B2  
APPLICATION NO. : 09/987249  
DATED : June 22, 2004  
INVENTOR(S) : Thomas K. Wong et al.

Page 1 of 1

It is certified that error appears in the above-identified patent and that said Letters Patent is hereby corrected as shown below:

In claim 1, column 9, line 5, "object server; and" should read --object, and--.

In claim 12, column 9, line 54, "claim further" should read --claim 9, further--.

Signed and Sealed this

Eighteenth Day of March, 2008

JON W. DUDAS  
*Director of the United States Patent and Trademark Office*